United States Patent
Huang

[11] Patent Number: 6,029,564
[45] Date of Patent: Feb. 29, 2000

[54] COMBINED BAKER AND ICE CREAM MAKER

[76] Inventor: Olivia Huang, No. 2, Lane 403, Sec. 3, Chung-San Rd., Wu-Jih Hsiang, Taichung Hsien, Taiwan

[21] Appl. No.: 09/386,974

[22] Filed: Aug. 31, 1999

[51] Int. Cl.[7] .............. A21B 1/00; A21D 8/00; A23G 9/00; A47J 27/00
[52] U.S. Cl. ............. 99/331; 62/342; 99/337; 99/348; 99/357; 99/455; 99/484; 99/492; 241/37.5; 241/92; 366/146; 366/314; 366/601
[58] Field of Search ............. 99/325–332, 337, 99/338, 340, 348, 357, 492, 352–355, 452–455, 466, 468, 484, 470; 62/342, 343, 136; 366/98, 144, 146, 149, 314, 601; 241/37.5, 92

[56] References Cited

U.S. PATENT DOCUMENTS

| | | | |
|---|---|---|---|
| 4,070,957 | 1/1978 | Korekawa et al. | 99/455 |
| 4,583,863 | 4/1986 | Pandolfi | 366/149 |
| 4,632,566 | 12/1986 | Masel et al. | 62/343 X |
| 4,643,583 | 2/1987 | Cecchini | 366/149 |
| 4,664,529 | 5/1987 | Cavalli | 366/144 X |
| 4,708,489 | 11/1987 | Carlson | 366/149 |
| 4,716,822 | 1/1988 | O'Brien | 99/455 |
| 4,974,965 | 12/1990 | Heinhold et al. | 99/455 X |
| 5,076,153 | 12/1991 | Takahashi et al. | 99/327 |
| 5,351,606 | 10/1994 | Matsuzaki | 99/348 |
| 5,363,746 | 11/1994 | Gordon | 99/328 |
| 5,433,139 | 7/1995 | Kitagawa et al. | 99/327 |
| 5,549,042 | 8/1996 | Bukoschek et al. | 62/342 X |

*Primary Examiner*—Timothy Simone
*Attorney, Agent, or Firm*—Trop, Pruner, Hu & Miles, P.C.

[57] ABSTRACT

A combined baker and ice cream maker includes a base plate, a barrel-receiving container, and a bread baking unit and an ice cream making unit which are to be selectively received in the container. Each of the bread baking unit and the ice cream making unit has a bottom mounting portion. A heater is disposed inside the container. A barrel seat is mounted on the base plate for selectively seating the bread baking unit and the ice cream making unit thereon. A shaft extends through the base plate into the barrel seat. A driving unit is mounted on the base plate, and is connected to the shaft. A switch is mounted on the base plate, and is connected to the heater. A lever is pivotally mounted on the base plate and has opposite first and second ends. The first end extends to the switch, while the second end extends to the barrel seat. The bottom mounting portion of the ice cream making unit has a portion for pushing the second end of the lever, thereby moving the first end to actuate the switch to an OFF position for de-energizing the heater.

4 Claims, 5 Drawing Sheets

COMBINED BAKER AND ICE CREAM MAKER

BACKGROUND OF THE INVENTION

1. Field of the Invention

This invention relates to a combined baker and ice cream maker, more particularly to a combined baker and ice cream maker that is capable of disconnecting a heater from an electrical power source when an ice cream making unit is mounted on the combined baker and ice cream maker.

2. Description of the Related Art

Conventionally, baking bread and making ice cream are carried out separately in two different apparatuses. In U.S. Pat. No. 5,836,237, there is disclosed an apparatus that combines a baker and an ice cream maker. The above described apparatus includes a barrel-receiving container for selectively receiving a bread baking unit and an ice cream making unit therewith, and a heater mounted on the container to provide heat for baking bread. Since the heater can be accidentally turned on while the ice cream making unit is mounted in the container, the heat released from the heater may damage the ice cream making unit.

SUMMARY OF THE INVENTION

Therefore, it is an object of the present invention to provide a combined baker and ice cream maker that is capable of overcoming the disadvantage described above.

Accordingly, a combined baker and ice cream maker of this invention comprises: a base plate; a barrel-receiving container mounted on the base plate; a bread baking unit and an ice cream making unit which are to be selectively received in the container, and each of which has a hollow cylindrical bottom mounting portion; a heater disposed inside the container for heating the bread baking unit; a barrel seat mounted securely on the base plate within the container for selectively and securely seating the bread baking unit and the ice cream making unit thereon, the barrel seat having a hollow cylinder extending upwardly from the base plate to selectively hold the bottom mounting portions of the bread baking unit and the ice cream making unit; a shaft extending upward through the base plate into the hollow cylinder to connect selectively with the bread baking unit and the ice cream making unit; a driving unit mounted on the base plate and connected to the shaft; a switch mounted on the base plate adjacent to the container and connected to the heater; and a lever pivotally mounted on the base plate and having opposite first and second ends, the first end extending to the switch while the second end extending to the barrel seat. The bottom mounting portion of the ice cream making unit has a portion for pushing the second end of the lever, thereby moving the first end to actuate the switch to an OFF position for de-energizing the heater.

BRIEF DESCRIPTION OF THE DRAWINGS

In drawings which illustrate an embodiment of the invention.

DETAILED DESCRIPTION OF THE PREFERRED EMBODIMENT

Figure 1:
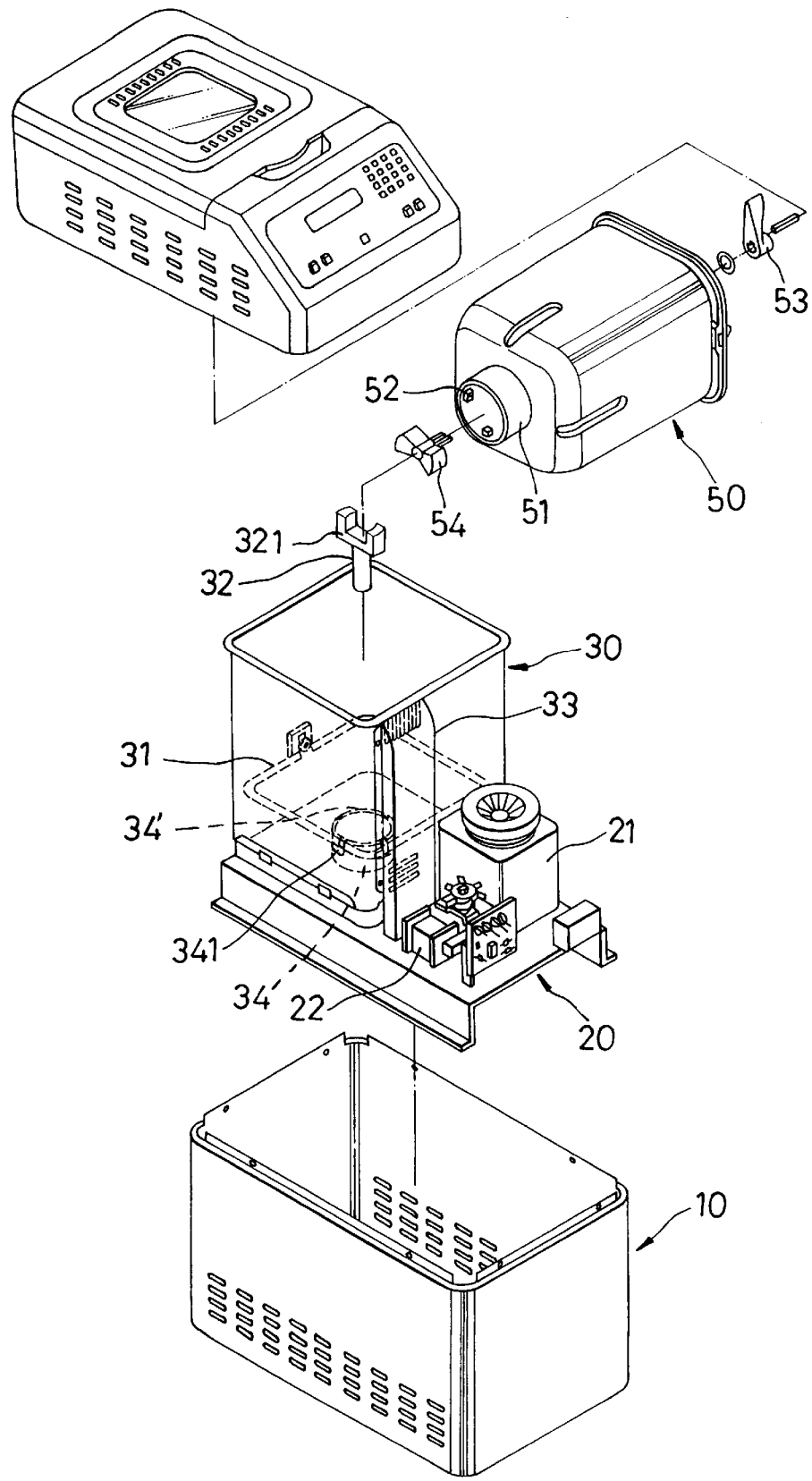
FIG. 1 is an exploded view of a combined baker and ice cream maker embodying this invention.
Figure 2:
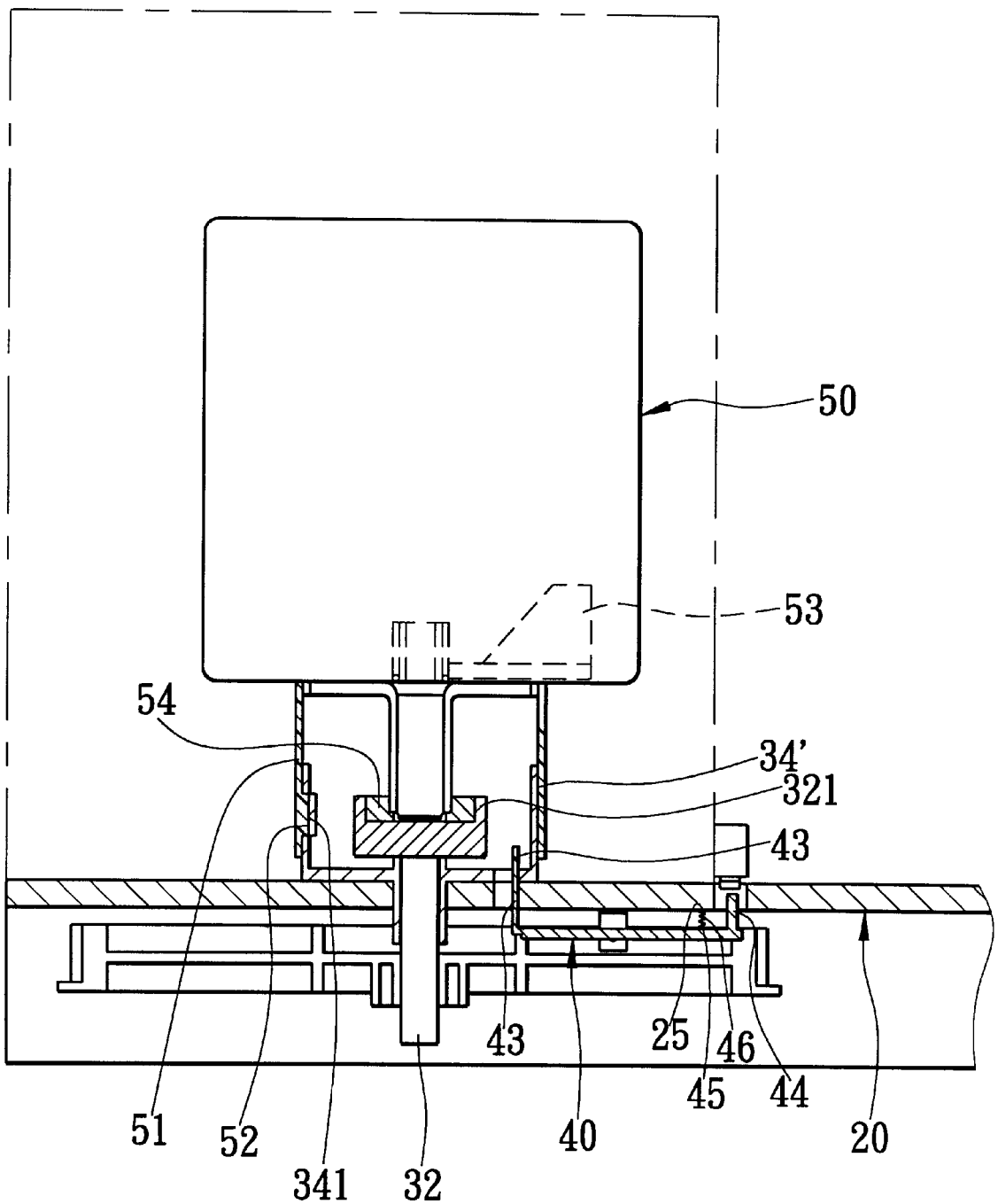
FIG. 2 is a fragmentary cross-sectional view of the combined baker and ice cream maker of FIG. 1.
Figure 3:
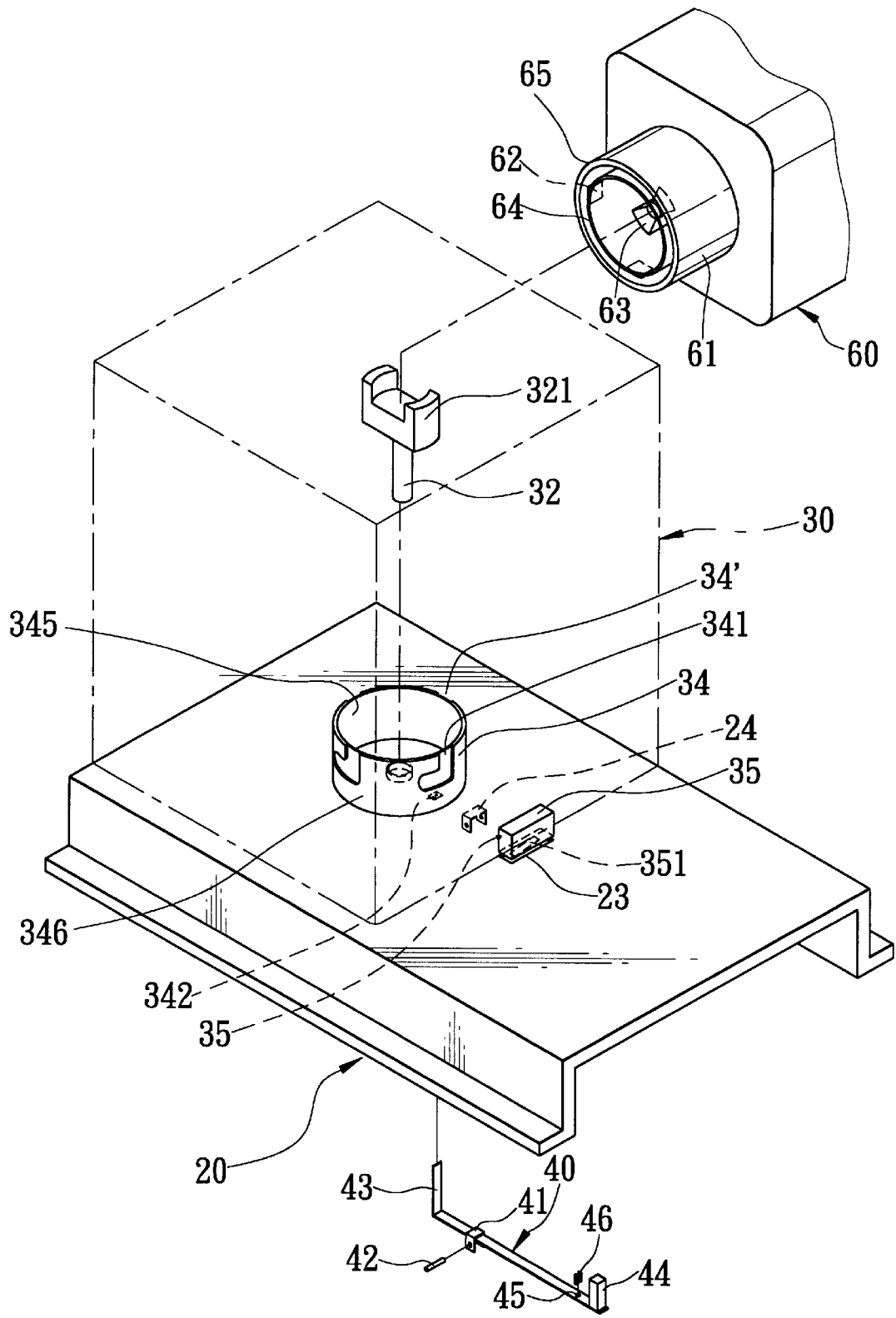
FIG. 3 is a fragmentary exploded view of the combined baker and ice cream maker of FIG. 1.

FIGS. 1 to 3 illustrate a combined baker and ice cream maker embodying this invention. The combined baker and ice cream maker includes a housing 10 which receives a base plate 20 therein. A barrel-receiving container 30 is mounted on the base plate 20. A motor 21 and a blower 22 are mounted on the base plate 20 adjacent to the container 30. The container 30 is provided with a heater 31 thereinside above the base plate 20. A shaft 32 extends through the base plate 20 into the container 30 centrally thereof, and is connected to the motor 21. A pipe 33 is disposed between and is connected to the container 30 and the blower 22. A barrel seat 34', in the form of a hollow cylinder 34, is mounted on the base plate 20 inside the container 30 for selectively and securely seating a bread baking unit 50 and an ice cream making unit 60. A plurality of L-shaped grooves 341 are formed in the cylinder 34. The bread baking unit 50 and the ice cream making unit 60 have first and second bottom mounting portions 51, 61, respectively. The first and second mounting portions 51, 61 include a plurality of tongues 52, 62 for engaging the grooves 341 of the cylinder 34. A U-shaped pushing arm unit 321 is mounted on the shaft 32. The bread baking unit 50 is provided with a stirrer 53 having a shaft with a first wing portion 54 extending into the first mounting portion 51 for interengaging the pushing arm unit 321. The ice cream making unit 60 has a second wing portion 63 extending into the second mounting portion 61 for interengaging the pushing arm unit 321. Detailed configurations of the housing 10, the base plate 20, the container 30, the bread baking unit 50, and the ice cream making unit 60 can be formed in U.S. Pat. No. 5,836,237, the entire disclosure of which is incorporated herein by reference.

First and second through-holes 23, 342 are formed in the base plate 20 adjacent to a side of the container 30 and the cylinder 34, respectively. A first protrusion 25 projects downwardly from a bottom side of the base plate 20 adjacent to the first through-hole 23. A lever holding member includes a first U-shaped member 24 mounted on and projecting downwardly from the bottom side of the base plate 20 between the first and second through-holes 23, 342. A switch 35 is mounted on the base plate 20 above the first through-hole 23. The switch 35 electrically connects a power source (not shown) to the blower 22 and the heater 31 via a button 351 which projects from the switch 35 slightly into the first through-hole 23.

A lever 40 is pivotally mounted on the first U-shaped member 24 via a second U-shaped member 41 with a guide pin 42 extending through through-holes in the first and second U-shaped members 24, 41. The lever 40 includes opposite first and second ends having upward projecting first and second prongs 44, 43 which extend upward through the base plate 20 into the first through-hole 23 to face the button 351 and into the cylinder 34 via the second through-hole 342, respectively. A second protrusion 45 extends upward from the lever 40 to face the first protrusion 25. A spring 46 has two opposite ends sleeved around the first and second protrusions 25, 45 so as to urge the lever 40 to move away from the switch 35.

The second mounting portion 61 of the ice cream making unit 60 includes concentric inner and outer cylindrical walls 64, 65 for confronting with inner and outer surfaces 345, 346 of the cylinder 34, respectively.

Referring now to FIG. 2 in combination with FIG. 1, when it is desired to bake bread, the bread baking unit 50 is received inside the container 30 and is seated securely on the barrel seat 34' via the engagement of the tongues 52 and grooves 341 with the first wing portion 54 interengaging the pushing arm unit 321. The first prong 44 of the lever 40 is urged by the spring 46, and is moved away from the button 351 so that the switch 35 is in an ON position, which connects the power source (not shown) to the blower 22 and the heater 31 via the button 351. When in operation, the stirrer 53 is driven by the motor 21 via the shaft 32, the pushing arm unit 321, and the first wing portion 54. Air generated from the blower 22 flows into the container 30, and is heated via the heater 31, thereby resulting in a baking action.

Figure 4:
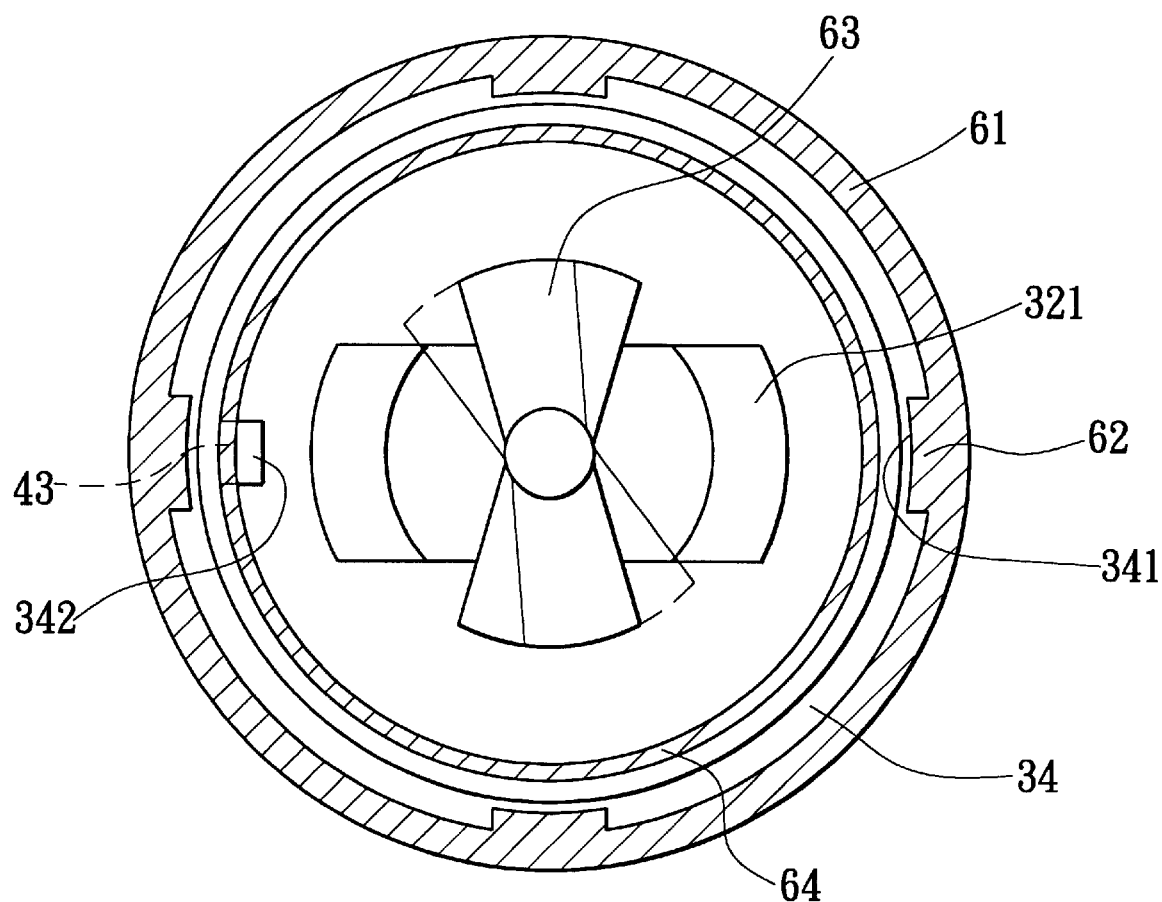
FIG. 4 is a cross-sectional top view of the combined baker and ice cream maker of FIG. 3.
Figure 5:
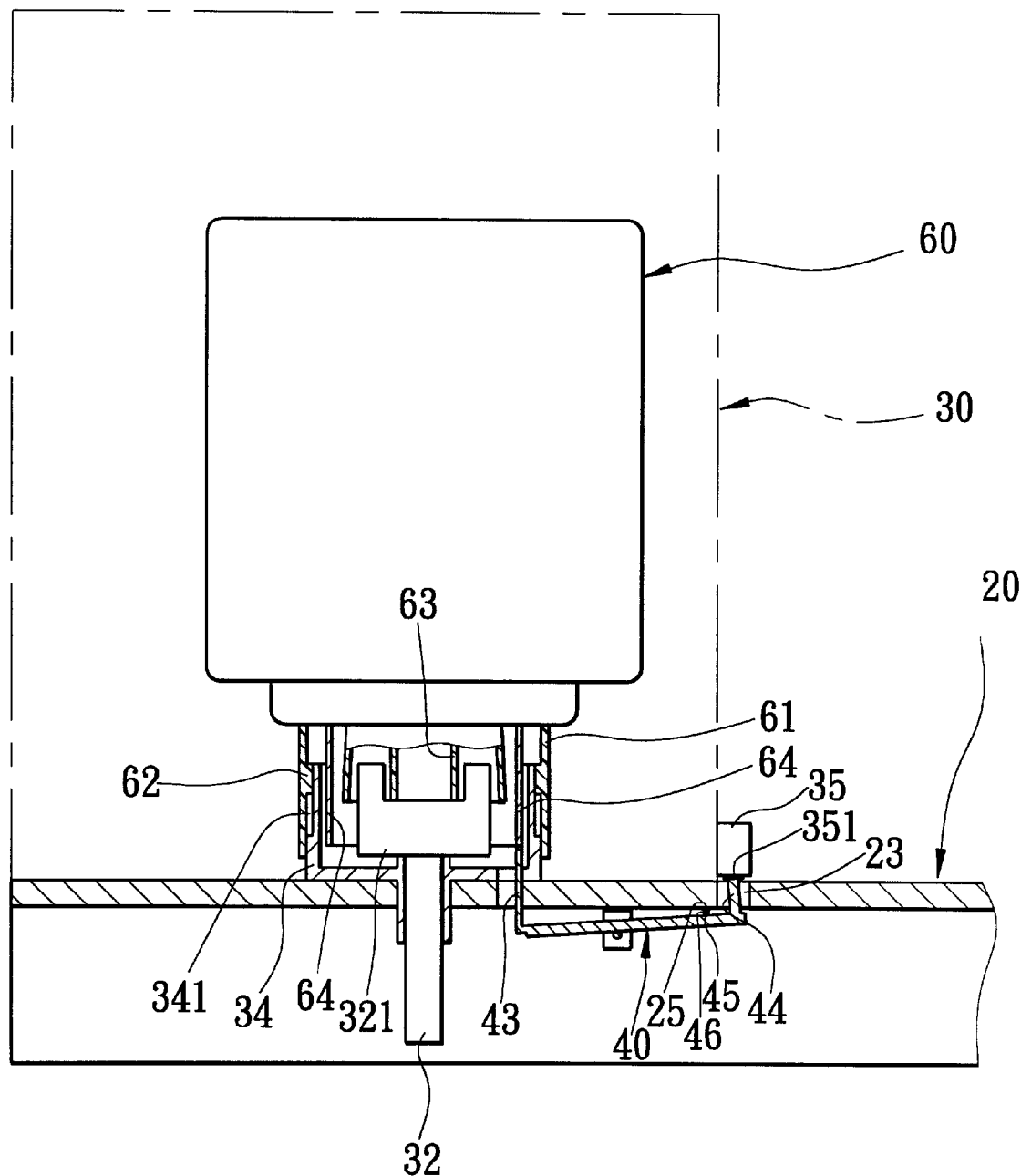
FIG. 5 is a cross-sectional side view of the combined baker and ice cream maker of FIG. 3.

Referring now to FIGS. 3 to 5 in combination with FIG. 1, when it is desired to make ice cream, the bread baking unit 50 is replaced with the ice cream making unit 60. The ice cream making unit 60 is seated securely on the barrel seat 34' via the engagement of the tongues 62 and the grooves 341 with the second wing portion 63 interengaging the pushing arm unit 321. An advantageous feature of this invention is that when the ice cream making unit 60 is seated securely on the barrel seat 34', the inner wall 64 of the second mounting portion 61 acts on the second prong 43 of the lever 40, thereby moving the first prong 44 to actuate the switch 25 to an OFF position, which disconnects the blower 22 and the heater 31 from the power source.

As the ice cream making unit 60 is removed from the barrel seat 34', the first prong 44 of the lever 40 is urged back by the spring 46 to move away from the button 351, thereby returning the switch 35 to the ON position.

With the invention thus explained, it is apparent that various modifications and variations can be made without departing from the spirit of the present invention. It is therefore intended that the invention be limited only as recited in the appended claims.

I claim:

1. A combined baker and ice cream maker, comprising:

a base plate;

a barrel-receiving container mounted on said base plate;

a bread baking unit and an ice cream making unit which are to be selectively received in said container, and each of which has a hollow cylindrical bottom mounting portion;

a heater disposed inside said container for heating said bread baking unit;

a barrel seat mounted securely on said base plate within said container for selectively and securely seating said bread baking unit and said ice cream making unit thereon, said barrel seat having a hollow cylinder extending upwardly from said base plate to selectively hold said bottom mounting portions of said bread baking unit and said ice cream making unit;

a shaft extending upward through said base plate into said hollow cylinder to connect selectively with said bread baking unit and said ice cream making unit;

a driving unit mounted on said base plate and connected to said shaft;

a switch mounted on said base plate adjacent to said container and connected to said heater; and a lever pivotally mounted on said base plate and having opposite first and second ends, said first end extending to said switch while said second end extending to said barrel seat;

wherein said bottom mounting portion of said ice cream making unit has a portion for pushing said second end of said lever, thereby moving said first end to actuate said switch to an OFF position for de-energizing said heater.

2. The apparatus of claim 1, wherein said base plate further includes a lever holding member projecting downward from a bottom side of said base plate, said lever being pivoted to said lever holding member, said first and second ends having upward projecting prongs which extend upward through said base plate toward said switch and said barrel seat, respectively.

3. The apparatus of claim 2, wherein said bottom mounting portion of said ice-cream making unit includes concentric inner and outer cylindrical walls that confront with an inner surface and an outer surface of said hollow cylinder of said barrel seat, respectively, when said bottom mounting portion of said ice cream making unit is seated on said hollow cylinder, said base plate further having a through-hole for passage of said prong of said second end of said lever into said hollow cylinder to reach said inner cylindrical wall.

4. The apparatus of claim 2, wherein said lever further comprises a spring mounted between said lever and said base plate adjacent to said first end to urge said first end of said lever to move away from said switch.

\* \* \* \* \*